US009824702B2

(12) United States Patent
Sasaki et al.

(10) Patent No.: US 9,824,702 B2
(45) Date of Patent: Nov. 21, 2017

(54) MAGNETIC HEAD FOR PERPENDICULAR MAGNETIC RECORDING WITH A COIL INCLUDING A FIRST WINDING PORTION OF ONE TURN AND A SECOND WINDING PORTION OF LESS THAN ONE TURN

(71) Applicant: HEADWAY TECHNOLOGIES, INC., Milpitas, CA (US)

(72) Inventors: Yoshitaka Sasaki, Santa Clara, CA (US); Hiroyuki Ito, Milpitas, CA (US); Kazuki Sato, Milpitas, CA (US); Yukinori Ikegawa, Milpitas, CA (US); Shigeki Tanemura, Milpitas, CA (US); Kenichi Takano, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 15/617,677

(22) Filed: Jun. 8, 2017

(65) Prior Publication Data
US 2017/0270953 A1 Sep. 21, 2017

Related U.S. Application Data

(62) Division of application No. 14/930,084, filed on Nov. 2, 2015, now Pat. No. 9,704,513.

(51) Int. Cl.
*G11B 5/17* (2006.01)
*G11B 5/31* (2006.01)
*G11B 5/127* (2006.01)

(52) U.S. Cl.
CPC .............. *G11B 5/17* (2013.01); *G11B 5/1278* (2013.01); *G11B 5/3123* (2013.01)

(58) Field of Classification Search
None
See application file for complete search history.

(56) References Cited

U.S. PATENT DOCUMENTS

| 8,498,077 | B1 | 7/2013 | Sasaki et al. |
| 8,503,130 | B1 | 8/2013 | Sasaki et al. |
| 8,867,168 | B2 | 10/2014 | Ota et al. |
| 2009/0034121 | A1 | 2/2009 | Ohta et al. |
| 2009/0116144 | A1 | 5/2009 | Lee et al. |

OTHER PUBLICATIONS

Dec. 16, 2016 Office Action Issued in U.S. Appl. No. 14/930,084.

*Primary Examiner* — Craig A. Renner
(74) *Attorney, Agent, or Firm* — Oliff PLC

(57) ABSTRACT

A magnetic head includes a coil, a main pole and a return path section. The return path section is located on the trailing side relative to the main pole so that a space is defined between the main pole and itself. The coil includes a first winding portion and a second winding portion connected in series. The first winding portion extends to pass through the aforementioned space, and extends once around the entire perimeter of the main pole as viewed from the medium facing surface. The second winding portion does not pass through the aforementioned space, and surrounds only a part of the entire perimeter of the main pole as viewed from the medium facing surface.

3 Claims, 11 Drawing Sheets

MAGNETIC HEAD FOR PERPENDICULAR MAGNETIC RECORDING WITH A COIL INCLUDING A FIRST WINDING PORTION OF ONE TURN AND A SECOND WINDING PORTION OF LESS THAN ONE TURN

CROSS-REFERENCE TO RELATED APPLICATIONS

This is a Division of and claims priority to application Ser. No. 14/930,084 filed Nov. 2, 2015. The disclosure of the prior application is hereby incorporated by reference herein in its entirety

BACKGROUND OF THE INVENTION

1. Field of the Invention

The present invention relates to a magnetic head for perpendicular magnetic recording for use to write data on a recording medium by means of a perpendicular magnetic recording system.

2. Description of the Related Art

The recording systems of magnetic read/write apparatuses include a longitudinal magnetic recording system in which the magnetization of signals is directed along the plane of a recording medium (the longitudinal direction), and a perpendicular magnetic recording system in which the magnetization of signals is directed perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil, a main pole and a return path section. The main pole has an end face located in a medium facing surface facing a recording medium. The coil produces a magnetic field corresponding to data to be written on the recording medium. The main pole passes a magnetic flux corresponding to the magnetic field produced by the coil, and produces a write magnetic field from its end face. The return path section is connected to the main pole. The return path section passes the magnetic flux corresponding to the magnetic field produced by the coil.

A magnetic head for use in a magnetic disk drive such as a hard disk drive is typically provided in a slider. The slider has the medium facing surface. The medium facing surface has an air inflow end (a leading end) and an air outflow end (a trailing end). An airflow that comes from the air inflow end into the space between the medium facing surface and the recording medium causes the slider to slightly fly over the surface of the recording medium.

Here, the side of the positions closer to the leading end relative to a reference position will be referred to as the leading side, and the side of the positions closer to the trailing end relative to the reference position will be referred to as the trailing side. The leading side is the rear side in the direction of travel of the recording medium relative to the slider. The trailing side is the front side in the direction of travel of the recording medium relative to the slider.

Magnetic heads for perpendicular magnetic recording are increasing in frequency of write signals to achieve higher recording densities. For such magnetic heads, it is thus required that the write current flowing through the coil should exhibit a rapid rise. To meet the requirement, it is particularly effective to shorten a magnetic path that passes through the return path section, which is provided on the trailing side of the main pole, and through the main pole. This is because an end of a record bit to be recorded on a recording medium is determined by the position of the trailing-side end of the end face of the main pole located in the medium facing surface. The return path section and the main pole define a space for the winding of the coil to pass through. To shorten the magnetic path passing through the return path section and the main pole, it is effective to reduce the number of turns of the coil.

U.S. Pat. No. 8,867,168 B2 discloses a first magnetic head and a second magnetic head. The first magnetic head includes a coil extending approximately ¾ time around the entire perimeter of the main pole as viewed from the medium facing surface. The second magnetic head includes a coil extending approximately 7/4 time around the entire perimeter of the main pole as viewed from the medium facing surface.

For the first magnetic head, however, the coil is unable to provide a sufficiently large magnetomotive force. For the second magnetic head, the winding of the coil passes twice through the space defined by the main pole and the return path section located on the trailing side of the main pole. Thus, it is not possible for the second magnetic head to sufficiently shorten the magnetic path passing through the return path section and the main pole.

OBJECT AND SUMMARY OF THE INVENTION

It is an object of the present invention to provide a magnetic head for perpendicular magnetic recording configured to allow the coil to provide a sufficiently large magnetomotive force and to allow a sufficient reduction in length of the magnetic path passing through the return path section provided on the trailing side of the main pole and through the main pole.

Magnetic heads for perpendicular magnetic recording of first and second aspects of the present invention each include a medium facing surface configured to face a recording medium, a coil for producing a magnetic field corresponding to data to be written on the recording medium, a main pole, and a first return path section formed of a magnetic material. The main pole has an end face located in the medium facing surface. The main pole is configured to pass a magnetic flux corresponding to the magnetic field produced by the coil, and to produce a write magnetic field for use to write data on the recording medium by means of a perpendicular magnetic recording system.

In the magnetic head for perpendicular magnetic recording of the first aspect of the present invention, the first return path section is located on the front side in the direction of travel of the recording medium relative to the main pole and connected to a part of the main pole located away from the medium facing surface so that a first space is defined between the main pole and the first return path section. The coil includes a first winding portion and a second winding portion connected in series. The first winding portion includes a first coil element extending to pass through the first space, and extends once around the entire perimeter of the main pole as viewed from the medium facing surface. The second winding portion extends less than once around the entire perimeter of the main pole as viewed from the medium facing surface, thus surrounding only a part of the entire perimeter of the main pole. No portion of the coil except the first coil element lies in the first space. The first coil element is part of the winding of the coil.

In the magnetic head for perpendicular magnetic recording of the first aspect of the present invention, the part of the entire perimeter of the main pole that the second winding portion surrounds may be ¼ to ¾ of the entire perimeter of the main pole.

The magnetic head for perpendicular magnetic recording of the first aspect of the present invention may further include a second return path section formed of a magnetic material. The second return path section is located on the rear side in the direction of travel of the recording medium relative to the main pole and connected to a part of the main pole located away from the medium facing surface so that a second space is defined between the main pole and the second return path section. In this case, the first winding portion may further include a second coil element extending to pass through the second space, while the second winding portion may include a third coil element extending to pass through the second space. Each of the second and third coil elements is part of the winding of the coil.

In the magnetic head for perpendicular magnetic recording of the second aspect of the present invention, the first return path section includes a first yoke section and a first coupling section, and defines a first space between the main pole and itself. The first yoke section is located on the front side in the direction of travel of the recording medium relative to the main pole. The first coupling section is located away from the medium facing surface and couples the first yoke section to the main pole. The first coupling section has a first contact surface in contact with the main pole. The coil includes a first winding portion and a second winding portion connected in series. The first winding portion includes a first coil element extending to pass through the first space, and extends once around the entire perimeter of the first coupling section. The second winding portion extends less than once around the entire perimeter of the first coupling section, thus surrounding only a part of the entire perimeter of the first coupling section. No portion of the coil except the first coil element lies in the first space.

In the magnetic head for perpendicular magnetic recording of the second aspect of the present invention, the part of the entire perimeter of the first coupling section that the second winding portion surrounds may be ¼ to ¾ of the entire perimeter of the first coupling section.

The magnetic head for perpendicular magnetic recording of the second aspect of the present invention may further include a second return path section formed of a magnetic material. The second return path section includes a second yoke section and a second coupling section, and defines a second space between the main pole and itself. The second yoke section is located on the rear side in the direction of travel of the recording medium relative to the main pole. The second coupling section is located away from the medium facing surface and couples the second yoke section to the main pole. The second coupling section has a second contact surface in contact with the main pole. In this case, the coil may further include a third winding portion. The third winding portion extends to pass through the second space and surrounds at least part of the entire perimeter of the second coupling section.

According to the present invention, no portion of the coil except the first coil element lies in the first space. The present invention thus allows a sufficient reduction in length of the magnetic path passing through the first return path section provided on the trailing side of the main pole and through the main pole. Further, according to the present invention, the coil includes the first winding portion of one turn and the second winding portion of less than one turn. This allows the coil to provide a sufficiently large magnetomotive force.

Other objects, features and advantages of the present invention will become fully apparent from the following description.

DETAILED DESCRIPTION OF THE PREFERRED EMBODIMENTS

[First Embodiment]

Figure 1:
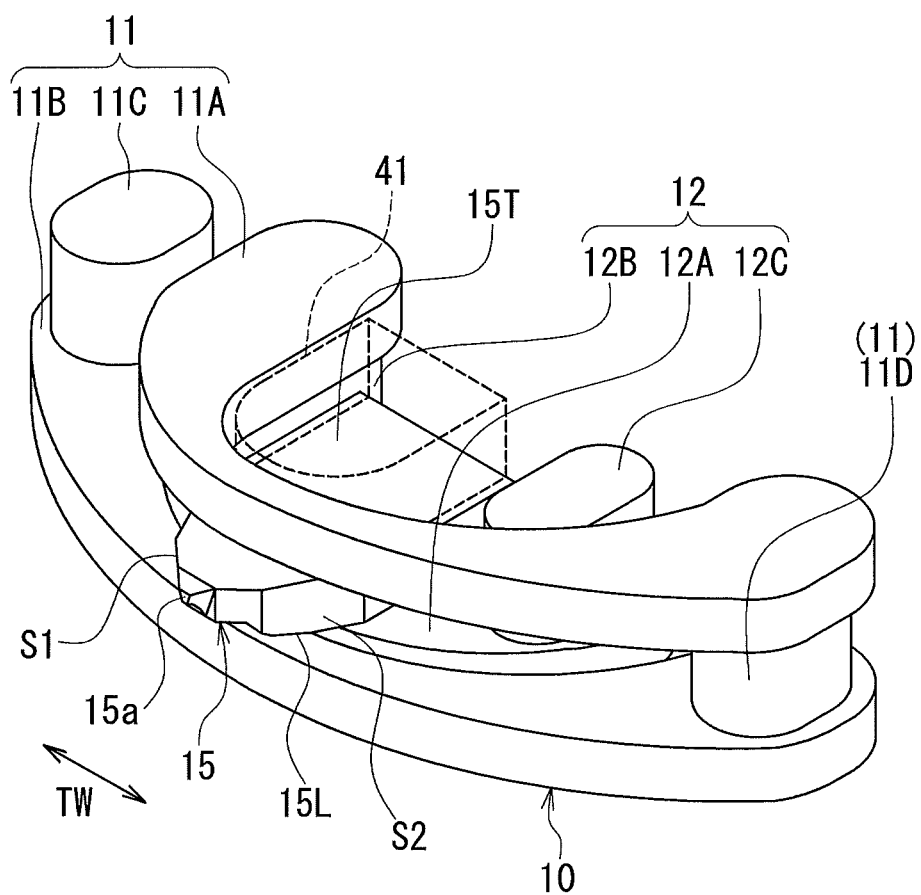
FIG. 1 is a perspective view showing the main part of a magnetic head according to a first embodiment of the invention.
Figure 2:
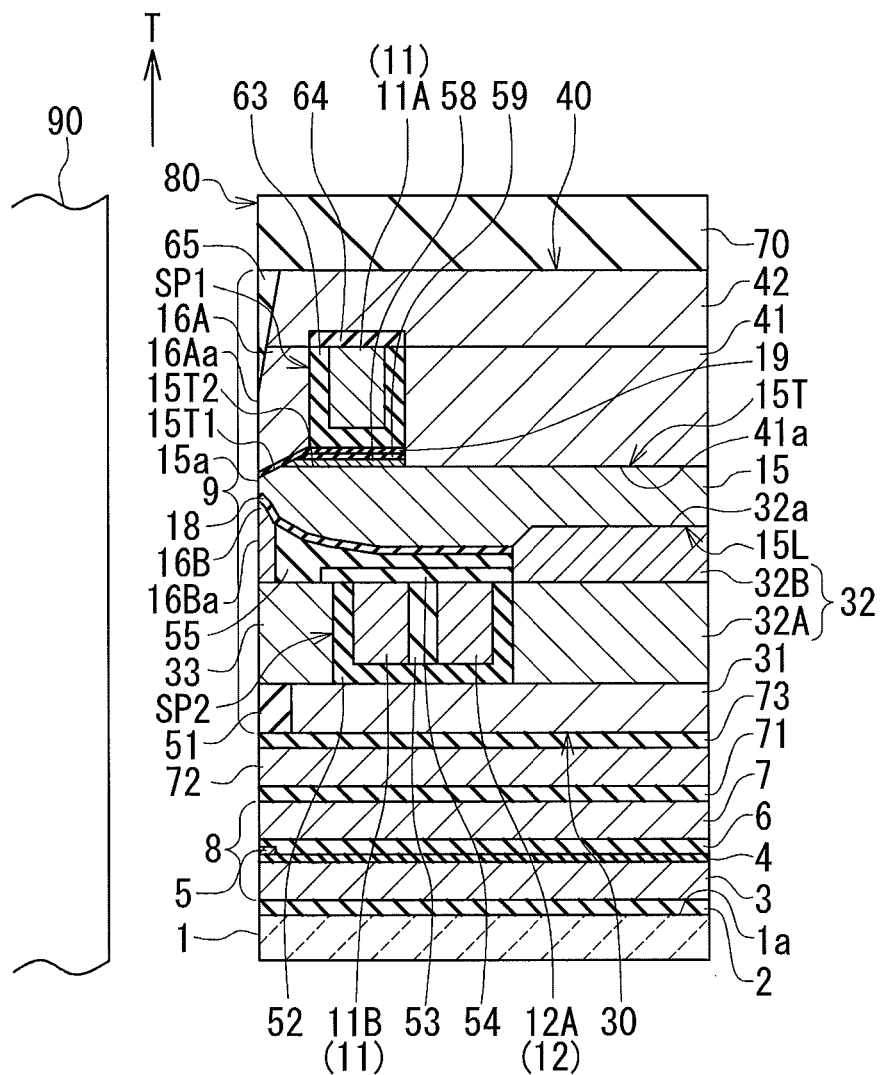
FIG. 2 is a cross-sectional view of the magnetic head according to the first embodiment of the invention.
Figure 3:
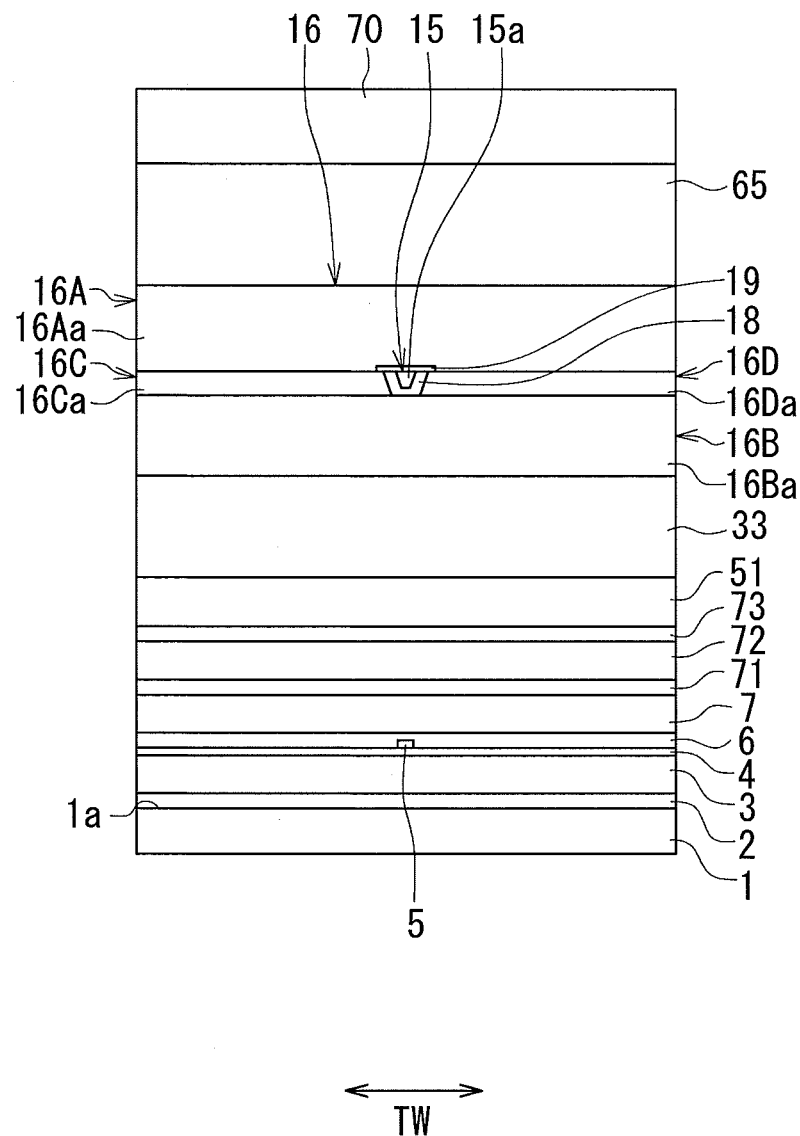
FIG. 3 is a front view showing the medium facing surface of the magnetic head according to the first embodiment of the invention.
Figure 4:
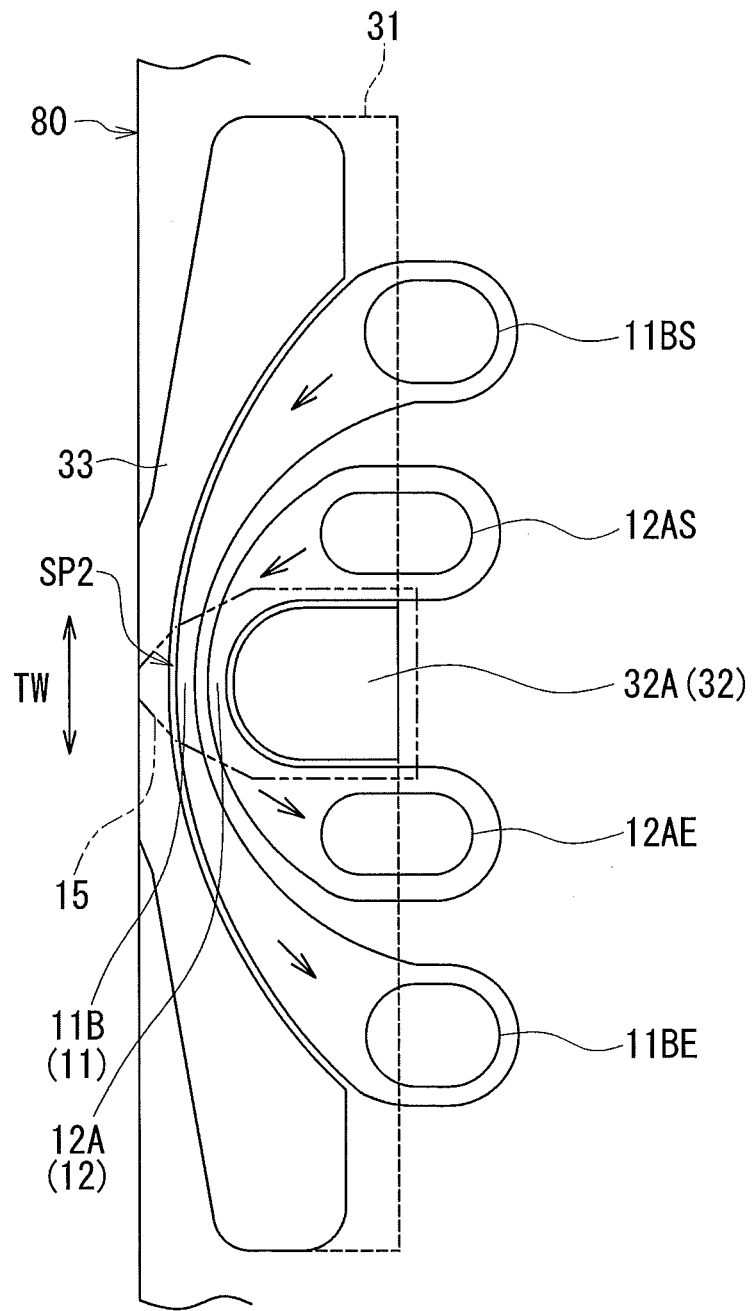
FIG. 4 is a plan view showing a second and a third coil element of the magnetic head according to the first embodiment of the invention.
Figure 5:
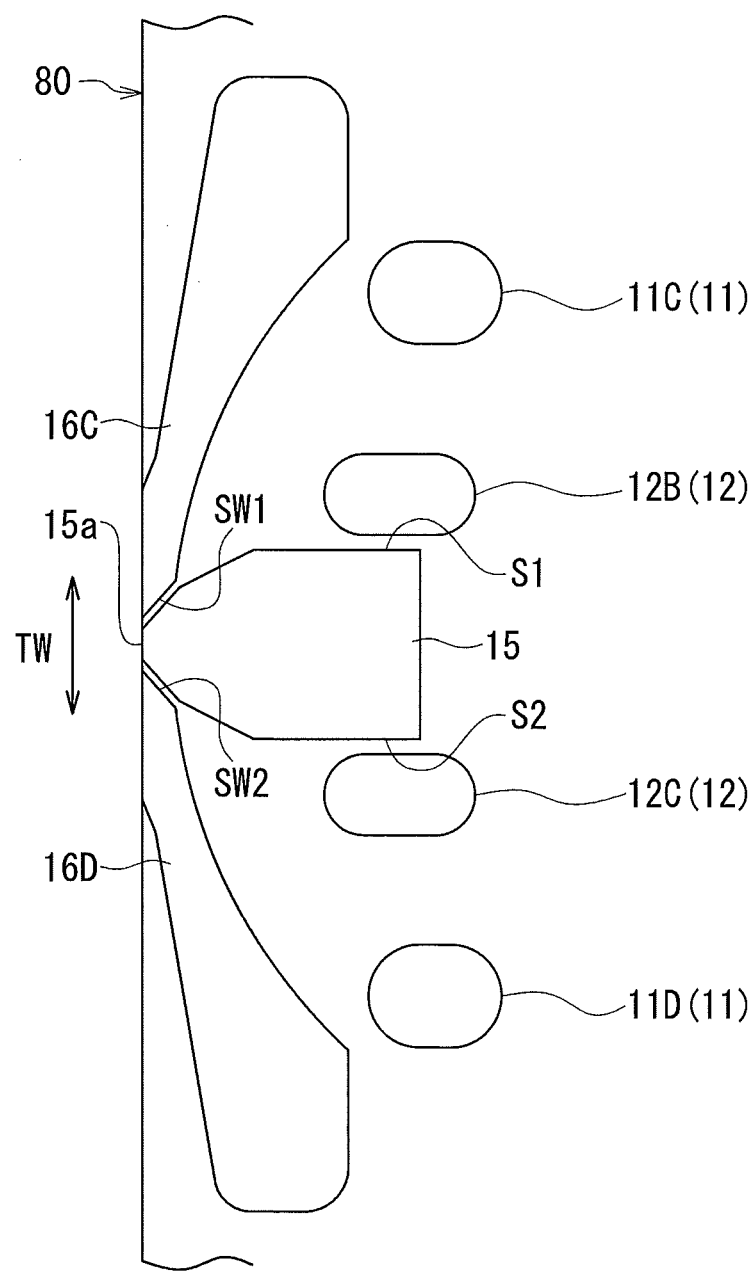
FIG. 5 is a plan view showing a main pole of the magnetic head according to the first embodiment of the invention.
Figure 6:
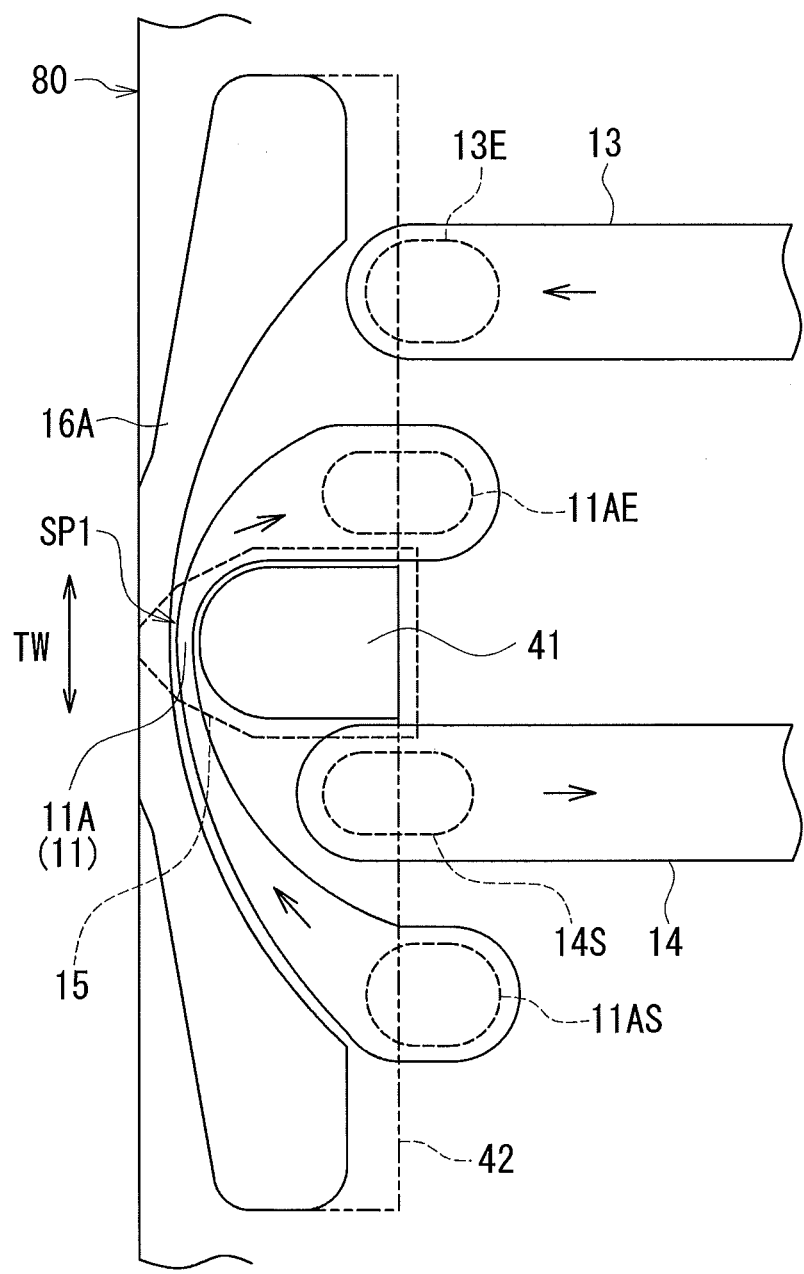
FIG. 6 is a plan view showing a first coil element of the magnetic head according to the first embodiment of the invention.

Preferred embodiments of the present invention will now be described in detail with reference to the drawings. First, reference is made to FIG. 1 to FIG. 6 to describe the configuration of a magnetic head for perpendicular magnetic recording (hereinafter simply referred to as magnetic head) according to a first embodiment of the invention. FIG. 1 is a perspective view showing the main part of the magnetic head according to the present embodiment. FIG. 2 is a cross-sectional view of the magnetic head according to the present embodiment. The arrow labeled T in FIG. 2 indicates the direction of travel of a recording medium. FIG. 3 is a front view showing the medium facing surface of the magnetic head according to the present embodiment. FIG. 4 is a plan view showing a second and a third coil element of the magnetic head according to the present embodiment. FIG. 5 is a plan view showing a main pole of the magnetic head according to the present embodiment. FIG. 6 is a plan view showing a first coil element of the magnetic head according to the present embodiment. In FIG. 3 to FIG. 6, the arrow labeled TW indicates the track width direction.

The magnetic head according to the present embodiment is for use in, for example, a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90.

Here, the side of the positions closer to the leading end relative to a reference position will be referred to as the leading side, and the side of the positions closer to the trailing end relative to the reference position will be referred to as the trailing side. The leading side is the rear side in the direction T of travel of the recording medium 90 relative to the slider. The trailing side is the front side in the direction T of travel of the recording medium 90 relative to the slider.

As shown in FIG. 2, the magnetic head has the medium facing surface 80 mentioned above. As shown in FIG. 2 and FIG. 3, the magnetic head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a first read shield layer 3 formed of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 formed of a magnetic material and disposed on the second read shield gap film 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head unit 8. The magnetic head further includes: a nonmagnetic layer 71 formed of a nonmagnetic material and disposed on the second read shield layer 7; a middle shield layer 72 formed of a magnetic material and disposed on the nonmagnetic layer 71; a nonmagnetic layer 73 formed of a nonmagnetic material and disposed on the middle shield layer 72; and a write head unit 9 disposed on the nonmagnetic layer 73.

The middle shield layer 72 has the function of shielding the MR element 5 from magnetic fields generated in the write head unit 9. The nonmagnetic layers 71 and 73 are formed of alumina, for example.

The write head unit 9 includes a coil 10, a main pole 15, and a write shield 16. The coil 10 produces a magnetic field corresponding to data to be written on the recording medium 90. The coil 10 includes a first winding portion 11 and a second winding portion 12. Each of the first and second winding portions 11 and 12 is formed of a conductive material such as copper. The first winding portion 11 and the second winding portion 12 are connected in series. As shown in FIG. 1, the coil 10 is wound around the main pole 15. The main pole 15 has an end face 15a located in the medium facing surface 80. The main pole 15 passes a magnetic flux corresponding to the magnetic field produced by the coil, and produces a write magnetic field for use to write data on the recording medium 90 by means of a perpendicular magnetic recording system. FIG. 2 shows a cross section that intersects the end face 15a of the main pole 15 and that is perpendicular to the medium facing surface 80 and to the top surface 1a of the substrate 1. Such a cross section will hereinafter be referred to as the main cross section.

The write shield 16 has an end face located in the medium facing surface 80. The end face of the write shield 16 includes first to fourth end face portions 16Aa, 16Ba, 16Ca, and 16Da. The first end face portion 16Aa is located on the trailing side, i.e., the front side in the direction T of travel of the recording medium 90, relative to the end face 15a of the main pole 15. The second end face portion 16Ba is located on the leading side, i.e., the rear side in the direction T of travel of the recording medium 90, relative to the end face 15a of the main pole 15. The third and fourth end face portions 16Ca and 16Da are located on opposite sides of the end face 15a of the main pole 15 in the track width direction TW. In the medium facing surface 80, the first to fourth end face portions 16Aa, 16Ba, 16Ca, and 16Da are arranged to surround the end face 15a of the main pole 15.

As shown in FIG. 3, the write shield 16 includes a top shield 16A, a bottom shield 16B, and two side shields 16C and 16D. The top shield 16A is located on the front side in the direction T of travel of the recording medium 90 relative to the main pole 15.

The bottom shield 16B is located on the rear side in the direction T of travel of the recording medium 90 relative to the main pole 15. The two side shields 16C and 16D are located on opposite sides of the main pole 15 in the track width direction TW and magnetically couple the top shield 16A and the bottom shield 16B to each other. The top shield 16A has the first end face portion 16Aa. The bottom shield 16B has the second end face portion 16Ba. The side shield 16C has the third end face portion 16Ca. The side shield 16D has the fourth end face portion 16Da.

The write shield 16 is formed of a magnetic material. For example, one of CoFeN, CoNiFe, FeNi, and CoFe can be used as the material of the write shield 16. The write head unit 9 further includes a first return path section 40 and a second return path section 30. Each of the first return path section 40 and the second return path section 30 is formed of a magnetic material. For example, CoFeN, CoNiFe, NiFe, or CoFe can be used to form each of the first return path section 40 and the second return path section 30. The first return path section 40 is located on the trailing side, i.e., the front side in the direction T of travel of the recording medium 90 relative to the main pole 15, and connects the write shield 16 and a part of the main pole 15 located away from the medium facing surface 80 to each other, thereby magnetically coupling the write shield 16 and the main pole 15 to each other. The second return path section 30 is located on the leading side, i.e., the rear side in the direction T of travel of the recording medium 90 relative to the main pole 15, and connects the write shield 16 and a part of the main pole 15 located away from the medium facing surface 80 to each other, thereby magnetically coupling the write shield 16 and the main pole 15 to each other.

As shown in FIG. 2, the second return path section 30 defines a second space SP2 between the main pole 15 and itself. The second return path section 30 includes a second yoke section 31, a second coupling section 32 and a third coupling section 33. The second yoke section 31 is located on the rear side in the direction T of travel of the recording medium 90 relative to the main pole 15. The second coupling section 32 is located away from the medium facing surface 80 and couples the second yoke section 31 to the main pole 15. The third coupling section 33 is located near the medium facing surface 80 and couples the second yoke section 31 to the bottom shield 16B. The second yoke section 31 lies on the nonmagnetic layer 73. Both the second and third coupling sections 32 and 33 lie on the second yoke section 31. The second coupling section 32 includes a first layer 32A lying on the second yoke section 31 and a second layer 32B lying on the first layer 32A. The second yoke section 31 has an end face facing toward the medium facing surface 80 and located at a distance from the medium facing surface 80. The third coupling section 33 has an end face located in the medium facing surface 80.

As shown in FIG. 2 and FIG. 4, the first winding portion 11 includes a second coil element 11B extending to pass through the second space SP2. The second winding portion 12 includes a third coil element 12A extending to pass through the second space SP2. Each of the second and third coil elements 11B and 12A is part of the winding of the coil 10. The second and third coil elements 11B and 12A are adjacent to each other in a direction perpendicular to the medium facing surface 80, the coil element 11B being located closer to the medium facing surface 80 than the coil element 12A. The write head unit 9 further includes: an insulating layer 51 formed of an insulating material, lying on the nonmagnetic layer 73 and surrounding the second yoke section 31; an insulating film 52 formed of an insulating material and isolating the second and third coil elements 11B and 12A from the second yoke section 31, the first layer 32A and the third coupling section 33; and an insulating layer 53 formed of an insulating material and disposed around the second coil element 11B, the third coil element 12A, the first layer 32A and the third coupling section 33. The top surfaces of the second coil element 11B, the third coil element 12A, the first layer 32A, the third coupling section 33, the insulating film 52 and the insulating layer 53 are even with each other. The insulating layers 51 and 53 and the insulating film 52 are formed of alumina, for example.

The bottom shield 16B lies on the third coupling section 33. The write head unit 9 further includes an insulating layer 54 formed of an insulating material, and a nonmagnetic layer 55 formed of a nonmagnetic material. The insulating layer 54 lies over the top surfaces of the second coil element 11B, the third coil element 12A, the insulating film 52 and the insulating layer 53, and a portion of the top surface of the third coupling section 33. The nonmagnetic layer 55 lies on the insulating layer 54 and surrounds the bottom shield 16B and the second layer 32B of the second coupling section 32. The insulating layer 54 and the nonmagnetic layer 55 are formed of alumina, for example.

The side shields 16C and 16D are on the bottom shield 16B. The main pole 15 has: the end face 15a; a bottom end 15L (see FIG. 2) located at the leading-side end, i.e., the rear-side end in the direction T of travel of the recording medium 90; a top surface 15T (see FIG. 2) located at the trailing-side end, i.e., the front-side end in the direction T of travel of the recording medium 90; and a first side surface Si and a second side surface S2 (see FIG. 5) located at opposite ends in the track width direction TW. As shown in FIG. 5, the side shield 16C has a first sidewall SW1 opposed to a portion of the first side surface S1 of the main pole 15 located near the medium facing surface 80. The side shield 16D has a second sidewall SW2 opposed to a portion of the second side surface S2 of the main pole 15 located near the medium facing surface 80.

The write head unit 9 further includes a first gap layer 18 formed of a nonmagnetic material. The first gap layer 18 is disposed to extend along the first and second sidewalls SW1 and SW2 of the side shields 16C and 16D, the top surface of the bottom shield 16B and the top surface of the nonmagnetic layer 55. The nonmagnetic material used to form the first gap layer 18 may be an insulating material or a nonmagnetic metal material. Alumina is an example of an insulating material that can be used to form the first gap layer 18. Ru is an example of a nonmagnetic metal material that can be used to form the first gap layer 18.

A portion of the main pole 15 lies above the top surfaces of the bottom shield 16B and the nonmagnetic layer 55. The first gap layer 18 is interposed between the portion of the main pole 15 and the top surfaces of the bottom shield 16B and the nonmagnetic layer 55. As shown in FIG. 3, the first gap layer 18 is interposed also between the first side surface Si of the main pole 15 and the first sidewall SW1 of the side shield 16C, and between the second side surface S2 of the main pole 15 and the second sidewall SW2 of the side shield 16D.

At a location apart from the medium facing surface 80, the bottom end 15L of the main pole 15 is in contact with the top surface of the second layer 32B of the second coupling section 32. The main pole 15 is formed of a magnetic metal material. The material employed for the main pole 15 may be NiFe, CoNiFe, or CoFe, for example. The write head unit 9 further includes a nonmagnetic metal layer 58 formed of a nonmagnetic metal material, and an insulating layer 59 formed of an insulating material. The nonmagnetic metal layer 58 lies on a first portion of the top surface 15T of the main pole 15, the first portion being located away from the medium facing surface 80. The insulating layer 59 lies on the top surface of the nonmagnetic metal layer 58. The nonmagnetic metal layer 58 is formed of Ru, NiCr, or NiCu, for example. The insulating layer 59 is formed of alumina, for example.

The write head unit 9 further includes a second gap layer 19. The second gap layer 19 is disposed to cover the nonmagnetic metal layer 58, the insulating layer 59 and part of the top surface 15T of the main pole 15. The second gap layer 19 has an end located in the medium facing surface 80. The second gap layer 19 may be formed of an insulating material such as alumina, or a nonmagnetic conductive material such as Ru, NiCu, Ta, W, NiB, or NiP. FIG. 2 illustrates an example in which the second gap layer 19 is formed of an insulating material, in particular.

The top shield 16A lies on the side shields 16C and 16D and the second gap layer 19. In the medium facing surface 80, part of the first end face portion 16Aa of the top shield 16A is spaced from the end face 15a of the main pole 15 by a predetermined distance created by the thickness of the second gap layer 19. The thickness of the second gap layer 19 is preferably in the range of 5 to 60 nm, and more preferably in the range of 10 to 20 nm.

As shown in FIG. 2, the first return path section 40 defines a first space SP1 between the main pole 15 and itself. The first return path section 40 includes a first yoke section 42 and a first coupling section 41. The first yoke section 42 is located on the front side in the direction T of travel of the recording medium 90 relative to the main pole 15. The first coupling section 41 is located away from the medium facing surface 80 and couples the first yoke section 42 to the main pole 15. The first coupling section 41 lies on a second portion of the top surface 15T of the main pole 15, the second portion being located away from the medium facing surface 80. The second portion of the top surface 15T of the main pole 15 is located farther from the medium facing surface 80 than is the first portion of the top surface 15T of the main pole 15.

As shown in FIG. 2 and FIG. 6, the first winding portion 11 includes a first coil element 11A extending to pass through the first space SP1. The first coil element 11A is part of the winding of the coil. No portion of the coil 10 except the first coil element 11A lies in the first space SP1.

The write head unit 9 further includes insulating films 63 and 64 each formed of an insulating material. The insulating film 63 is interposed between the first coil element 11A and the second gap layer 19, between the first coil element 11A and the top shield 16A, and between the first coil element 11A and the first coupling section 41. The insulating film 64 covers the first coil element 11A and the insulating film 63. For example, the insulating films 63 and 64 are formed of alumina.

The write head unit 9 further includes a nonmagnetic layer (not illustrated) formed of a nonmagnetic material and disposed around the main pole 15, the top shield 16A, the side shields 16C and 16D and the first coupling section 41. Part of the first winding portion 11 and part of the second winding portion 12 are embedded in the non-illustrated nonmagnetic layer. The non-illustrated nonmagnetic layer is formed of alumina, for example.

The first yoke section 42 lies on the top shield 16A, the first coupling section 41 and the insulating film 64, and connects the top shield 16A and the first coupling section 41. The first yoke section 42 has an end face facing toward the medium facing surface 80 and located at a distance from the medium facing surface 80. The distance from the medium facing surface 80 to any point on the end face of the first yoke section 42 increases with increasing distance between the point and the top surface 1a of the substrate 1.

The write head unit 9 further includes a nonmagnetic layer 65 formed of a nonmagnetic material and disposed around the first yoke section 42. The nonmagnetic layer 65 is formed of alumina, for example.

As shown in FIG. 2 and FIG. 3, the magnetic head further includes a protective layer 70 formed of a nonmagnetic material and disposed to cover the write head unit 9. The protective layer 70 is formed of, for example, an inorganic insulating material such as alumina.

As has been described, the magnetic head according to the present embodiment includes the medium facing surface 80, the read head unit 8, and the write head unit 9. The read head unit 8 and the write head unit 9 are stacked on the substrate 1. The write head unit 9 is located on the front side in the direction T of travel of the recording medium 90 relative to the read head unit 8.

The write head unit 9 includes the coil 10 including the first winding portion 11 and the second winding portion 12, the main pole 15, the write shield 16, the first return path section 40, and the second return path section 30. The write shield 16 includes the top shield 16A, the bottom shield 16B and the two side shields 16C and 16D.

The first return path section 40 includes the first yoke section 42 and the first coupling section 41. The first return path section 40 is located on the trailing side, i.e., the front side in the direction T of travel of the recording medium 90 relative to the main pole 15 and connected to a part of the main pole 15 located away from the medium facing surface 80 so that the first space SP1 is defined between the main pole 15 and the first return path section 40. As shown in FIG. 2, the first coupling section 41 has a first contact surface 41a in contact with the main pole 15.

The second return path section 30 includes the second yoke section 31, the second coupling section 32 and the third coupling section 33. The second return path section 30 is located on the leading side, i.e., the rear side in the direction T of travel of the recording medium 90 relative to the main pole 15 and connected to a part of the main pole 15 located away from the medium facing surface 80 so that the second space SP2 is defined between the main pole 15 and the second return path section 30. As shown in FIG. 2, the second coupling section 32 has a second contact surface 32a in contact with the main pole 15.

The write shield 16 captures a disturbance magnetic field applied to the magnetic head from the outside thereof. This makes it possible to prevent the disturbance magnetic field from being intensively captured into the main pole 15 and thereby causing erroneous writing on the recording medium 90. The write shield 16 also has the function of capturing a magnetic flux that is produced from the end face 15a of the main pole 15 and spreads in directions other than the direction perpendicular to the plane of the recording medium 90, and thereby preventing the magnetic flux from reaching the recording medium 90. Furthermore, the write shield 16 and the first and second return path sections 40 and 30 have the function of allowing a magnetic flux that has been produced from the end face 15a of the main pole 15 and has magnetized a portion of the recording medium 90 to flow back.

The shape of the main pole 15 will now be described in detail with reference to FIG. 2, FIG. 3 and FIG. 5. The main pole 15 has the end face 15a, the bottom end 15L, the top surface 15T, the first side surface S1 and the second side surface S2. As shown in FIG. 5, the main pole 15 may include a width changing portion and a constant width portion. The width changing portion has the end face 15a and an end opposite to the end face 15a. The constant width portion is connected to the end of the width changing portion. In the width changing portion, the width of the top surface 15T in the track width direction TW gradually increases with increasing distance from the medium facing surface 80. In the constant width portion, the width of the top surface 15T in the track width direction TW is constant regardless of distance from the medium facing surface 80.

The width changing portion and the constant width portion are equal in width of the top surface 15T in the track width direction TW when viewed at the boundary between the width changing portion and the constant width portion.

The main pole 15 may further include a track width defining portion located between the width changing portion and the medium facing surface 80. In the track width defining portion, the width of the top surface 15T in the track width direction TW is approximately constant regardless of distance from the medium facing surface 80. The track width defining portion and the width changing portion are equal in width of the top surface 15T in the track width direction TW when viewed at the boundary between the track width defining portion and the width changing portion.

As shown in FIG. 2, the top surface 15T includes an inclined portion 15T1 and a flat portion 15T2, the inclined portion 15T1 being located closer to the medium facing surface 80 than the flat portion 15T2. The inclined portion 15T1 has a first end located in the medium facing surface 80 and a second end opposite to the first end. The flat portion 15T2 is connected to the second end of the inclined portion 15T1. The inclined portion 15T1 is inclined with respect to the medium facing surface 80 and the direction perpendicular to the medium facing surface 80 such that its second end is located on the front side in the direction T of travel of the recording medium 90 relative to its first end. The flat portion 15T2 extends substantially perpendicularly to the medium facing surface 80.

The bottom end 15L may include an inclined portion opposed to the top surface of the bottom shield 16B. The inclined portion of the bottom end 15L has a first end located in the medium facing surface 80 and a second end opposite to the first end. The inclined portion of the bottom end 15L may be an edge formed by two intersecting surfaces, or may be a surface connecting two surfaces. The inclined portion of the bottom end 15L is inclined with respect to the medium facing surface 80 and the direction perpendicular to the medium facing surface 80 such that its second end is located on the rear side in the direction T of travel of the recording medium 90 relative to its first end. The other portion of the bottom end 15L than the inclined portion is a surface connected to the second end of the inclined portion.

As shown in FIG. 3, the end face 15a of the main pole 15 has a first side in contact with the second gap layer 19, a second side connected to one end of the first side, and a third side connected to the other end of the first side. The first side defines the track width. The position of an end of a record bit to be recorded on the recording medium 90 is determined by the position of the first side. The width of the end face 15a of the main pole 15 in the track width direction TW decreases with increasing distance from the first side, that is, with decreasing distance to the top surface 1a of the substrate 1. Each of the second side and the third side forms an angle of, for example, 7° to 17°, or preferably 10° to 15°, with respect to a direction perpendicular to the top surface 1a of the substrate 1. The first side has a length in the range of 0.05 to 0.20 μm, for example.

The coil 10 will now be described in detail with reference to FIG. 1, FIG. 2 and FIG. 4 to FIG. 6. The first winding portion 11 of the coil 10 includes the first and second coil elements 11A and 11B. The second winding portion 12 of the coil 10 includes the third coil element 12A. As shown in FIG. 6, the coil 10 further includes two lead portions 13 and 14. The lead portions 13 and 14 are coplanar with the first coil element 11A and located outside the first space SP1. The lead portions 13 and 14 are each formed of a conductive material such as copper.

As shown in FIG. 1 and FIG. 5, the first winding portion 11 further includes two columnar portions 11C and 11D each having a top surface and a bottom surface. The columnar portions 11C and 11D are located on opposite sides of the main pole 15 in the track width direction TW and are each spaced from the main pole 15. The columnar portion 11C electrically connects the lead portion 13 and the second coil element 11B.

The columnar portion 11D electrically connects the first coil element 11A and the second coil element 11B. The columnar portion 11C, the second coil element 11B, the columnar portion 11D and the first coil element 11A are connected in series to constitute the first winding portion 11. The first winding portion 11 extends once around the entire perimeter of the main pole 15 as viewed from the medium facing surface 80. The first winding portion 11 is thus of one turn.

As shown in FIG. 6, the first coil element 11A has a coil connection 11AS in contact with the top surface of the columnar portion 11D, and a coil connection 11AE in contact with the top surface of a columnar portion of the second winding portion 12 described later. As shown in FIG. 4, the second coil element 11B has a coil connection 11BS in contact with the bottom surface of the columnar portion 11C, and a coil connection 11BE in contact with the bottom surface of the columnar portion 11D.

As shown in FIG. 1 and FIG. 5, the second winding portion 12 further includes two columnar portions 12B and 12C each having a top surface and a bottom surface. The columnar portions 12B and 12C are located on opposite sides of the main pole 15 in the track width direction TW and are each spaced from the main pole 15. The columnar portion 12B electrically connects the first coil element 11A of the first winding portion 11 and the third coil element 12A. The coil connection 11AE of the first coil element 11A is in contact with the top surface of the columnar portion 12B. The columnar portion 12C electrically connects the third coil element 12A and the lead portion 14.

The second winding portion 12 extends less than once around the entire perimeter of the main pole 15 as viewed from the medium facing surface 80, thus surrounding only a part of the entire perimeter of the main pole 15. Thus, the second winding portion 12 is of less than one turn. The part of the entire perimeter of the main pole 15 that the second winding portion 12 surrounds is preferably ¼ to ¾ of the entire perimeter of the main pole 15. In other words, the second winding portion 12 is preferably of ¼ to ¾ turn. In the present embodiment, the columnar portion 12B, the third coil element 12A and the columnar portion 12C are connected in series to constitute the second winding portion 12, and the second winding portion 12 surrounds ¾ of the entire perimeter of the main pole 15 as viewed from the medium facing surface 80. The second winding portion 12 is thus of ¾ turn.

As shown in FIG. 4, the third coil element 12A has a coil connection 12AS in contact with the bottom surface of the columnar portion 12B, and a coil connection 12AE in contact with the bottom surface of the columnar portion 12C.

As shown in FIG. 6, the lead portion 13 has a coil connection 13E in contact with the top surface of the columnar portion 11C. The lead portion 14 has a coil connection 14S in contact with the top surface of the columnar portion 12C. In the present embodiment, the lead portion 13, the first winding portion 11, the second winding portion 12 and the lead portion 14 are connected in series in this order. In FIG. 1, FIG. 4 and FIG. 6, the arrows in the winding portions 11 and 12 and the lead portions 13 and 14 indicate the direction of current flowing through the coil 10 at some point in time.

Now, functions and effects specific to the magnetic head according to the present embodiment will be described. In the present embodiment, as described previously, no portion of the coil 10 except the first coil element 11A lies in the first space SP1. Thus, the present embodiment allows a sufficient reduction in length of the magnetic path passing through the first return path section 40 provided on the trailing side of the main pole 15 and through the main pole 15. The present embodiment thus makes it possible to achieve write signals of higher frequency, and to thereby achieve higher recording densities.

In the present embodiment, the coil 10 includes the first winding portion 11 of one turn and the second winding portion 12 of less than one turn (particularly, ¾ turn). This makes it possible for the coil 10 to provide a sufficiently increased magnetomotive force without a change in length of the magnetic path passing through the first return path section 40 and the main pole 15 when compared to a case where the coil 10 consists only of the first winding portion 11.

The effects of the present embodiment will be described in more detail with reference to the results of a simulation. The simulation used an example model, a first comparative example model and a second comparative example model described below. The example model is a model fabricated on the basis of the magnetic head according to the present embodiment. In the magnetic head according to the present embodiment, as described previously, a single coil element passes through the first space SP1.

The first comparative example model is a model fabricated on the basis of a magnetic head of a first comparative example which includes a coil of a first comparative example in place of the coil 10 of the present embodiment. The coil of the first comparative example includes two winding portions connected in series. One of the two winding portions extends to pass through the first space SP1 and extends once around the entire perimeter of the first coupling section 41. The other of the two winding portions extends to pass through the second space SP2 and extends once around the entire perimeter of the second coupling section 32. In the magnetic head of the first comparative example, a single coil element passes through the first space SP1. The magnetic head of the first comparative example and the magnetic head according to the present embodiment are equal in length of the magnetic path passing through the first return path section 40 and the main pole 15.

The second comparative example model is a model fabricated on the basis of a magnetic head of a second comparative example which includes a coil of a second comparative example in place of the coil 10 of the present embodiment. The coil of the second comparative example includes two winding portions connected in series. One of the two winding portions extends to pass through the first space SP1 and extends twice around the entire perimeter of the first coupling section 41. The other of the two winding portions extends to pass through the second space SP2 and extends twice around the entire perimeter of the second coupling section 32. In the magnetic head of the second comparative example, two coil elements pass through the first space SP1. The magnetic path passing through the first return path section 40 and the main pole 15 is longer in the magnetic head of the second comparative example than in the magnetic head according to the present embodiment.

The simulation determined the strength distribution in the track width direction TW of a write magnetic field with varying magnitude of current Iw supplied to the coil for each of the example model and the first and second comparative example models. FIG. 7 to FIG. 10 show the simulation results. In FIG. 7 to FIG. 10, the curve 101 shows the simulation results for the example model, the curve 102 shows the simulation results for the first comparative example model, and the curve 103 shows the simulation results for the second comparative example model.

Figure 7:
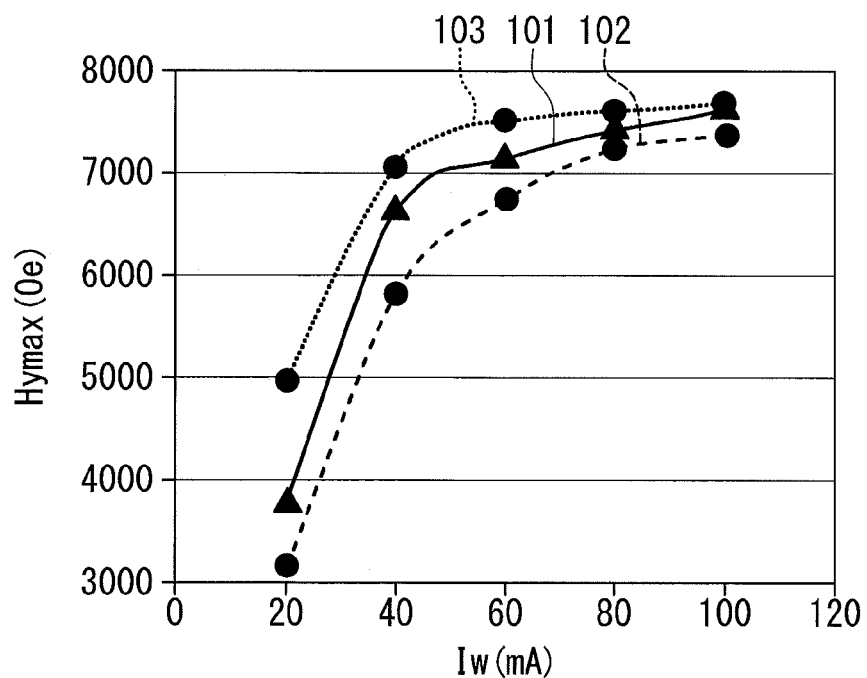
FIG. 7 is a characteristic diagram showing the relationship between a current supplied to the coil and a maximum value of a perpendicular component of a write magnetic field.
Figure 8:
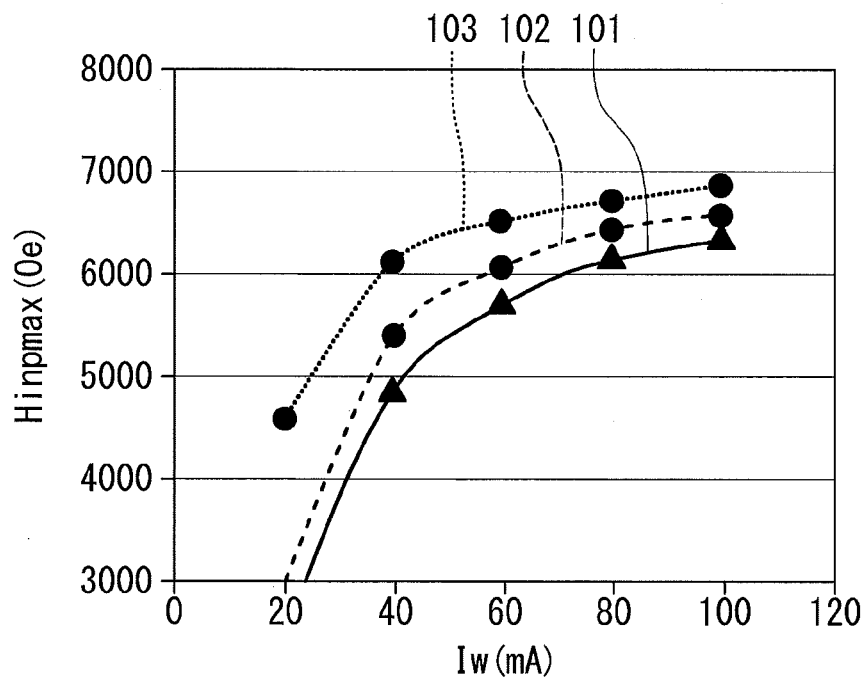
FIG. 8 is a characteristic diagram showing the relationship between the current supplied to the coil and a maximum value of an in-plane component of the write magnetic field.
Figure 9:
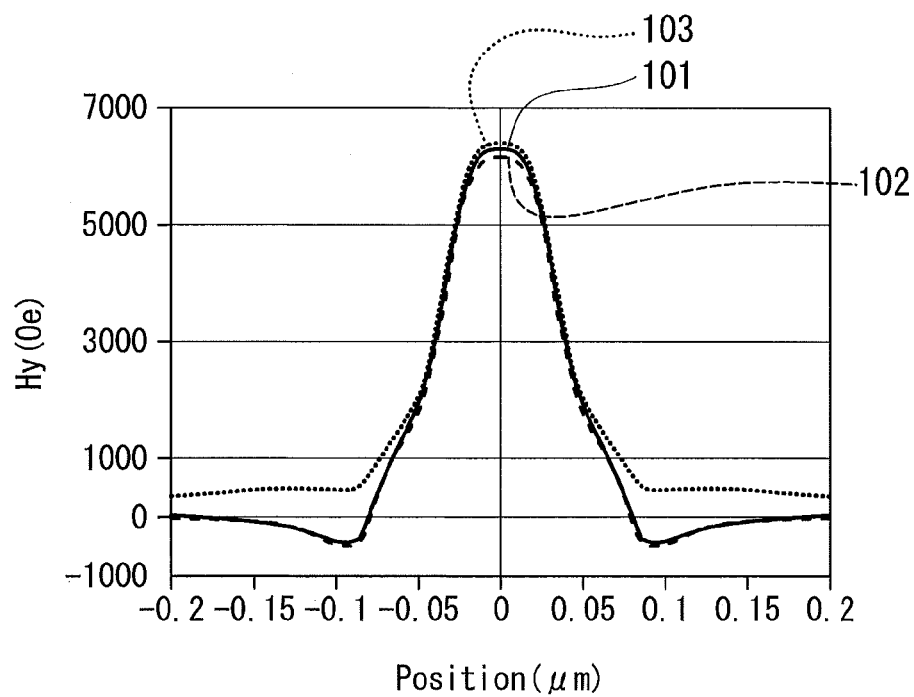
FIG. 9 is a characteristic diagram showing the distribution of the perpendicular component of the write magnetic field in the track width direction.
Figure 10:
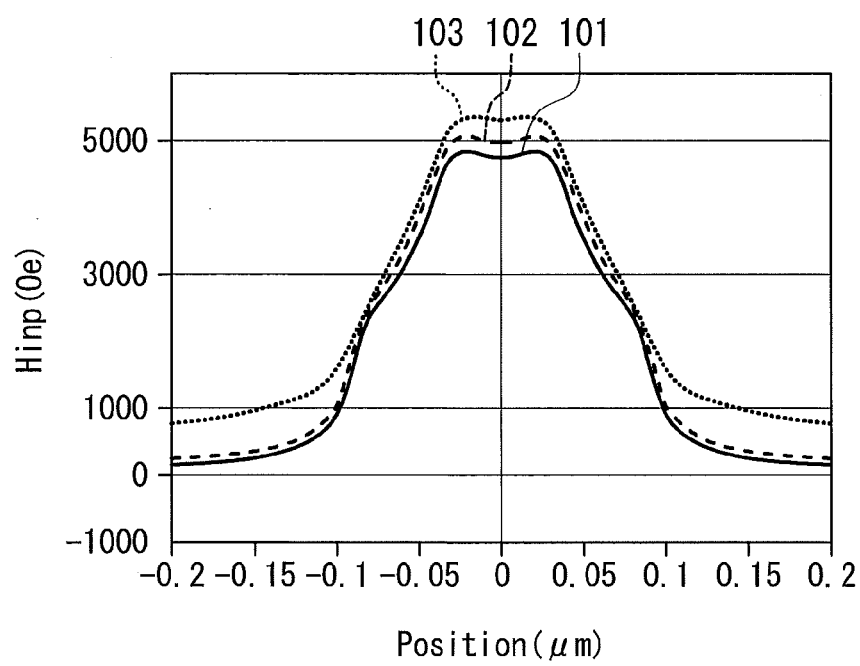
FIG. 10 is a characteristic diagram showing the distribution of the in-plane component of the write magnetic field in the track width direction.

FIG. 7 shows the relationship between the current Iw and a maximum value Hymax of a component Hy of the write magnetic field. The component Hy is a component in a direction perpendicular to the surface of the recording medium 90, and will be referred to as the perpendicular component. FIG. 8 shows the relationship between the current Iw and a maximum value Hinpmax of a component Hinp of the write magnetic field. The component Hinp is a component in a direction parallel to the surface of the recording medium 90, and will be referred to as the in-plane component. FIG. 9 shows the distribution of the perpendicular component Hy in the track width direction TW. FIG. 10 shows the distribution of the in-plane component Hinp in the track width direction TW. The perpendicular component Hy and the in-plane component Hinp are in units of Oe. Note that 1 Oe=79.6 A/m. On the horizontal axes of FIG. 9 and FIG. 10, 0 µm represents the position of the center of the end face 15a of the main pole 15 in the track width direction TW in the example model and the first and second comparative example models.

As shown in FIG. 7, the example model is higher than the first comparative example model and lower than the second comparative example model in maximum value Hymax of the perpendicular component Hy. The maximum value Hymax of the perpendicular component Hy represents the writing capability of the write head unit onto the recording medium 90.

As shown in FIG. 8, the example model is lower than the first and second comparative example models in maximum value Hinpmax of the in-plane component Hinp. This indicates that the magnetic head according to the present embodiment has a higher capability to reduce adjacent track erasure (ATE) and wide-area track erasure (WATE) as compared to the magnetic heads of the first and second comparative examples.

As shown in FIG. 9, the full width at half maximum of the perpendicular component Hy for the example model is substantially equal to that for each of the first and second comparative example models. On the other hand, as shown in FIG. 10, the full width at half maximum of the in-plane component Hinp for the example model is smaller than that for each of the first and second comparative example models. This indicates that the magnetic head according to the present embodiment achieves a smaller recording width on the recording medium 90 and a higher capability to reduce adjacent track erasure (ATE) and wide-area track erasure (WATE), as compared to the magnetic heads of the first and second comparative examples.

If comparisons are made between the magnetic head according to the present embodiment and the magnetic head of the first comparative example which are the same in the length of the magnetic path passing through the first return path section 40 and the main pole 15, it can be seen from the simulation results that the magnetic head according to the present embodiment is able to increase the maximum value of the perpendicular component Hy to achieve a higher writing capability, and also able to achieve a smaller recording width on the recording medium 90 and a higher reduction in adjacent track erasure (ATE) and wide-area track erasure (WATE), as compared to the magnetic head of the first comparative example.

[Second Embodiment]

Figure 11:
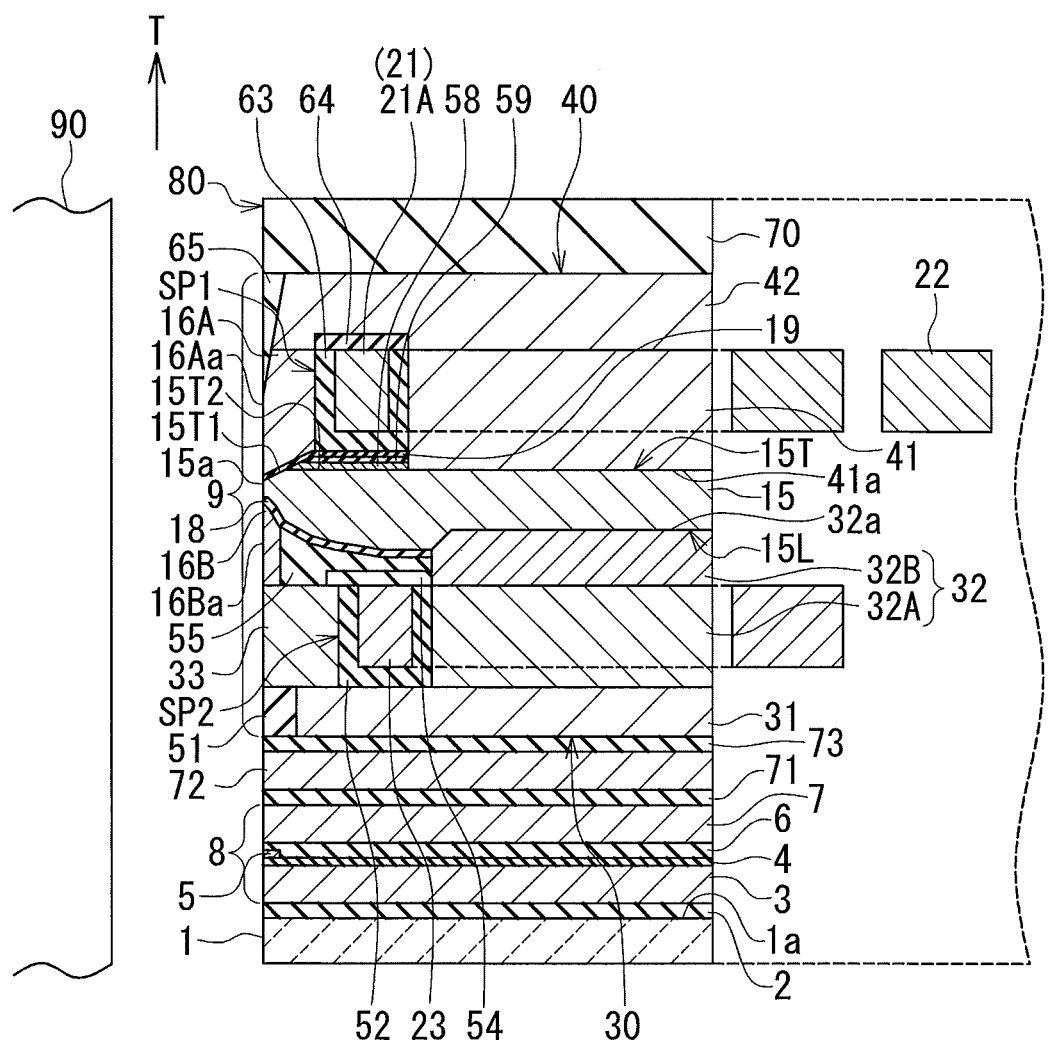
FIG. 11 is a cross-sectional view of a magnetic head according to a second embodiment of the invention.
Figure 12:
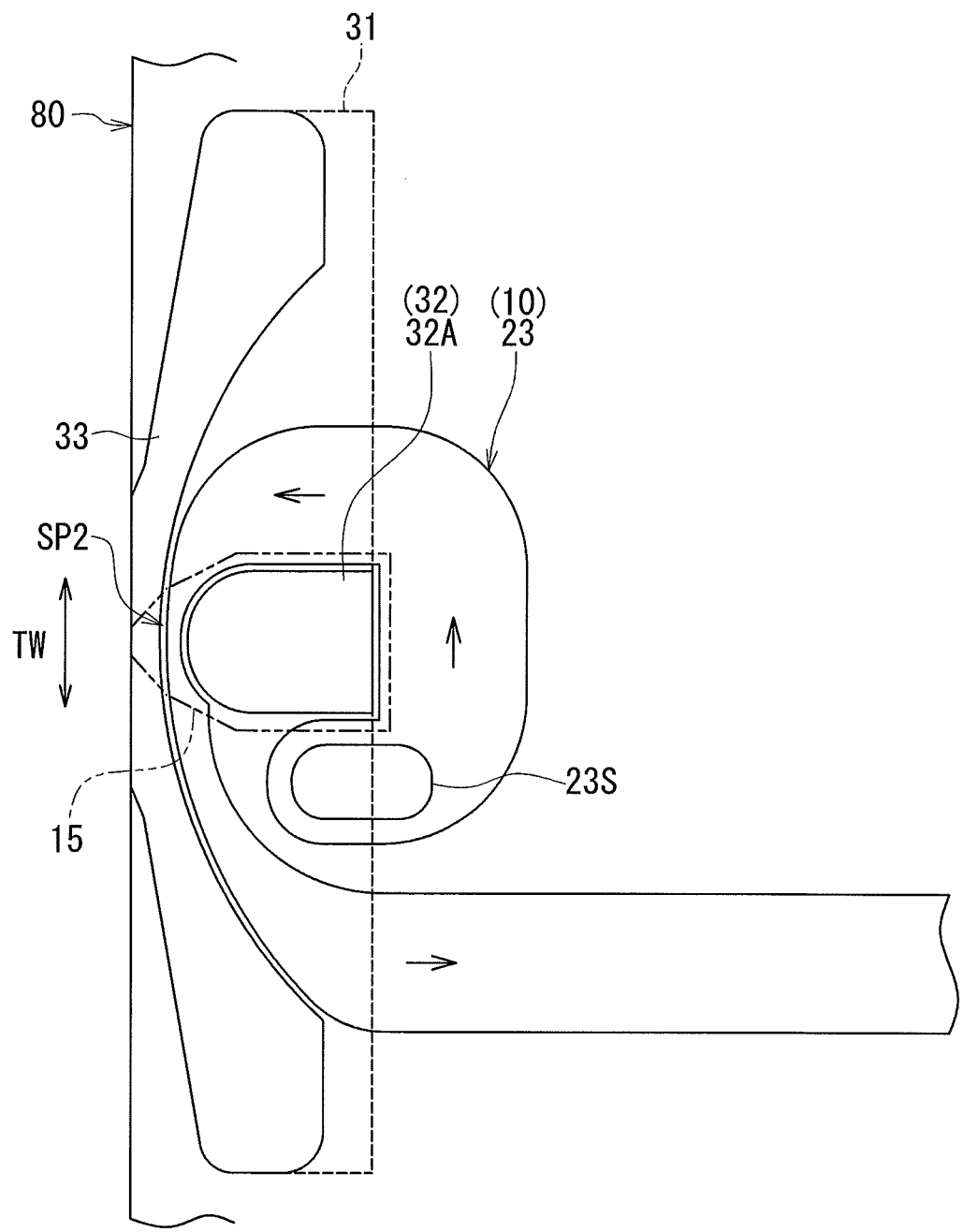
FIG. 12 is a plan view showing a third winding portion of a coil of the magnetic head according to the second embodiment of the invention.
Figure 13:
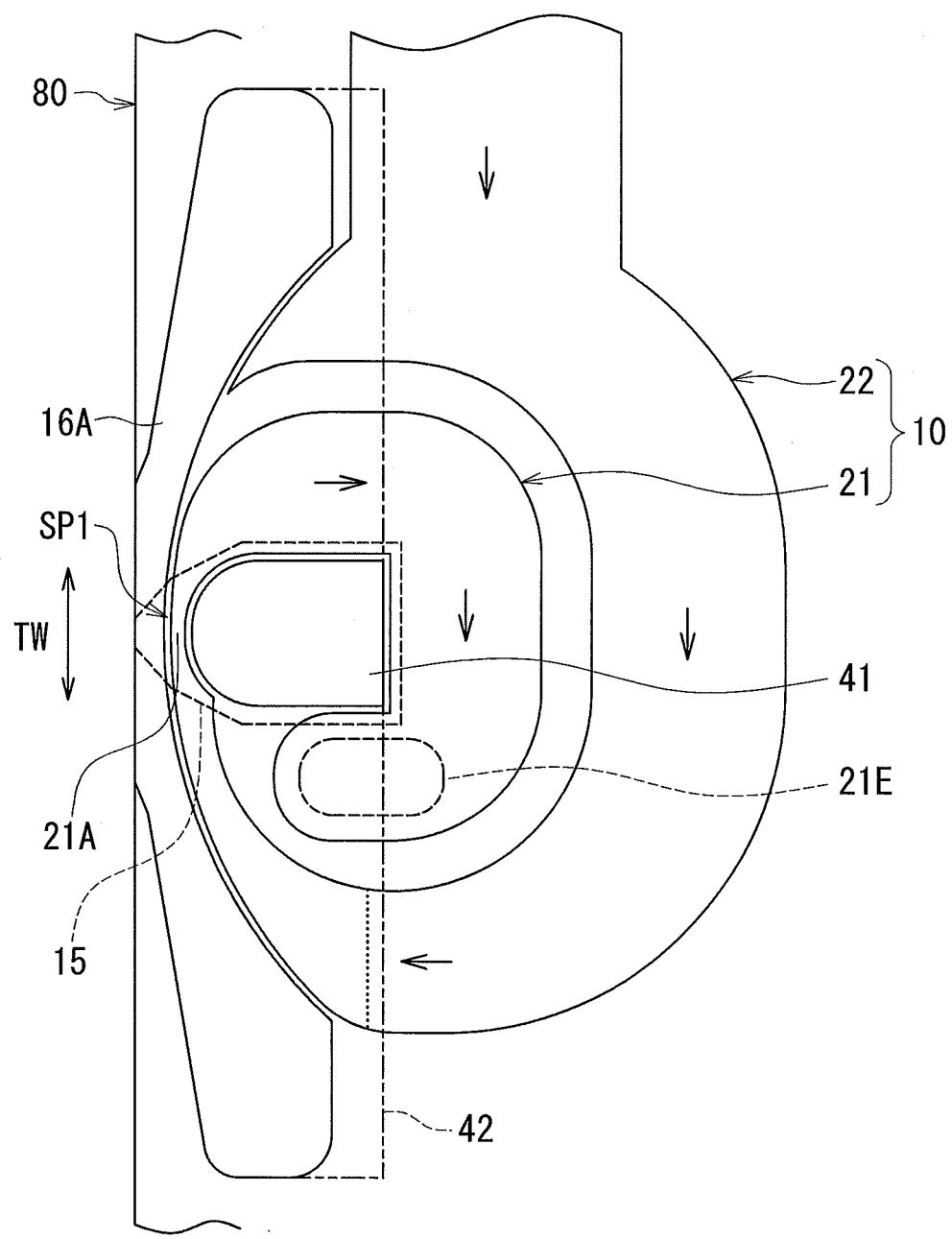
FIG. 13 is a plan view showing a first and a second winding portion of the coil of the magnetic head according to the second embodiment of the invention.

A magnetic head according to a second embodiment of the present invention will now be described with reference to FIG. 11 to FIG. 13. FIG. 11 is a cross-sectional view of the magnetic head according to the present embodiment. The arrow labeled T in FIG. 11 indicates the direction of travel of a recording medium. FIG. 12 is a plan view showing a third winding portion of the coil of the magnetic head according to the present embodiment. FIG. 13 is a plan view showing a first and a second winding portion of the coil of the magnetic head according to the present embodiment. In FIG. 12 and FIG. 13, the arrow labeled TW indicates the track width direction.

The magnetic head according to the present embodiment differs from the magnetic head according to the first embodiment in the following ways. The coil 10 of the present embodiment includes a first winding portion 21, a second winding portion 22 and a third winding portion 23, in place of the first winding portion 11, the second winding portion 12 and the two lead portions 13 and 14 of the first embodiment. The first winding portion 21 and the second winding portion 22 are connected in series. In FIG. 13 the boundary between the first winding portion 21 and the second winding portion 22 is shown by a dotted line.

The first winding portion 21 includes a first coil element 21A extending to pass through the first space SP1, and extends once around the entire perimeter of the first coupling section 41. The first winding portion 21 is thus of one turn. The first coil element 21A is part of the winding of the coil 10.

The second winding portion 22 is contiguous with the first winding portion 21. The second winding portion 22 extends less than once around the entire perimeter of the first coupling section 41, thus surrounding only a part of the entire perimeter of the first coupling section 41. The second winding portion 22 is thus of less than one turn. The part of the entire perimeter of the first coupling section 41 that the second winding portion 22 surrounds is preferably ¼ to ¾ of the entire perimeter of the first coupling section 41. In other words, the second winding portion 22 is preferably of ¼ to ¾ turn. In the present embodiment, the second winding portion 22 surrounds ½ of the entire perimeter of the first coupling section 41. The second winding portion 22 is thus of ½ turn.

The third winding portion 23 extends to pass through the second space SP2, and surrounds at least part of the entire perimeter of the second coupling section 32. In the present embodiment, the third winding portion 23 extends once around the entire perimeter of the second coupling section 32. The third winding portion 23 is thus of one turn.

The coil 10 of the present embodiment further includes a connection layer (not illustrated) that is columnar in shape and has a top surface and a bottom surface. The connection layer penetrates a plurality of layers interposed between the first winding portion 21 and the third winding portion 23, and electrically connects the first winding portion 21 and the third winding portion 23. The connection layer is formed of a conductive material such as copper.

The first winding portion 21 has a coil connection 21E in contact with the top surface of the aforementioned connection layer. The coil connection 21E is located near an end of the first winding portion 21 opposite from the boundary between the first winding portion 21 and the second winding portion 22. The third winding portion 23 has a coil connection 23S in contact with the bottom surface of the aforementioned connection layer. In the present embodiment, the second winding portion 22, the first winding portion 21, the aforementioned connection layer and the third winding portion 23 are connected in series in this order. In FIG. 12 and FIG. 13, the arrows in the first to third winding portions 21, 22 and 23 indicate the direction of current flowing through the coil 10 at some point in time.

In the present embodiment, no portion of the coil 10 except the first coil element 21A lies in the first space SP1. The present embodiment allows a sufficient reduction in length of the magnetic path passing through the first return path section 40 and the main pole 15, as does the first embodiment. The present embodiment thus makes it possible to achieve write signals of higher frequency, and to thereby achieve higher recording densities.

In the present embodiment, the coil 10 includes the first winding portion 21 of one turn, the second winding portion 22 of less than one turn (particularly ½ turn), and the third winding portion 23 of one turn. This makes it possible for the coil 10 to provide a sufficiently increased magnetomotive force without a change in length of the magnetic path passing through the first return path section 40 and the main pole 15 or a change in length of the magnetic path passing through the second return path section 30 and the main pole 15 when compared to a case where the coil 10 consists only of the first and third winding portions 21 and 23.

The remainder of configuration, function and effects of the present embodiment are similar to those of the first embodiment.

The present invention is not limited to the foregoing embodiments, and various modifications may be made thereto. For example, as far as the requirements of the appended claims are met, the first to third winding portions may be shaped and located in any desired manner, and need not necessarily be as in the respective examples illustrated in the foregoing embodiments.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A magnetic head for perpendicular magnetic recording, comprising:

a medium facing surface configured to face a recording medium;

a coil for producing a magnetic field corresponding to data to be written on the recording medium;

a main pole having an end face located in the medium facing surface, the main pole being configured to pass a magnetic flux corresponding to the magnetic field produced by the coil, and to produce a write magnetic field for use to write the data on the recording medium by means of a perpendicular magnetic recording system; and a first return path section formed of a magnetic material, wherein the first return path section is located on a front side in a direction of travel of the recording medium relative to the main pole and connected to a part of the main pole located away from the medium facing surface so that a first space is defined between the main pole and the first return path section, the coil includes a first winding portion and a second winding portion connected in series, the first winding portion includes a first coil element extending to pass through the first space, and extends once around an entire perimeter of the main pole as viewed from the medium facing surface, the second winding portion extends less than once around the entire perimeter of the main pole as viewed from the medium facing surface, thus surrounding only ½ to ¾ of the entire perimeter of the main pole, and no portion of the coil except the first coil element lies in the first space.

2. The magnetic head for perpendicular magnetic recording according to claim 1, wherein the second winding portion surrounds only ¾ of the entire perimeter of the main pole.

3. The magnetic head for perpendicular magnetic recording according to claim 1, further comprising a second return path section formed of a magnetic material, wherein
- the second return path section is located on a rear side in the direction of travel of the recording medium relative to the main pole and connected to a part of the main pole located away from the medium facing surface so that a second space is defined between the main pole and the second return path section,
- the first winding portion further includes a second coil element extending to pass through the second space, and
- the second winding portion includes a third coil element extending to pass through the second space.

\* \* \* \* \*